(12) United States Patent
Boodaghians et al.

(10) Patent No.: US 9,701,410 B2
(45) Date of Patent: Jul. 11, 2017

(54) TWO-STAGE FLUSH AND GREY WATER FLUSH SYSTEMS AND DEVICES

(71) Applicant: MAG AEROSPACE INDUSTRIES, LLC, Carson, CA (US)

(72) Inventors: Razmik B. Boodaghians, Glendale, CA (US); Kevin Huang, Los Angeles, CA (US); Christoph Goeschel, Seattle, WA (US); Christina Ortolan, Long Beach, CA (US); Volker Antonczyk, Hamburg (DE); Timothy Birbeck, Torrance, CA (US)

(73) Assignee: MAG Aerospace Industries, LLC, Carson, CA (US)

( * ) Notice: Subject to any disclaimer, the term of this patent is extended or adjusted under 35 U.S.C. 154(b) by 169 days.

(21) Appl. No.: 13/804,539

(22) Filed: Mar. 14, 2013

(65) Prior Publication Data

US 2013/0305444 A1 Nov. 21, 2013

Related U.S. Application Data

(60) Provisional application No. 61/648,194, filed on May 17, 2012.

(51) Int. Cl.
*E03D 1/00* (2006.01)
*B64D 11/02* (2006.01)
(Continued)

(52) U.S. Cl.
CPC ............ *B64D 11/02* (2013.01); *E03D 5/003* (2013.01); *E03D 9/05* (2013.01); *E03F 1/006* (2013.01); *Y02T 50/46* (2013.01)

(58) Field of Classification Search
USPC .................... 4/665, 306, 347, 321, 472, 473
See application file for complete search history.

(56) References Cited

U.S. PATENT DOCUMENTS

| 4,358,864 A | 11/1982 | Medrano |
| 4,376,314 A | 3/1983 | Iwans |

(Continued)

FOREIGN PATENT DOCUMENTS

| CN | 104334452 A | 2/2015 |
| DE | 10257133 A1 | 9/2004 |

(Continued)

OTHER PUBLICATIONS

International Search Report and Written Opinion dated Sep. 16, 2013 in Application No. PCT/US2013/031224.

(Continued)

*Primary Examiner* — Lauren Crane
(74) *Attorney, Agent, or Firm* — Kilpatrick Townsend & Stockton LLP; Dean W. Russell; Kristin M. Crall

(57) ABSTRACT

Embodiments of the present invention provide a grey water flush system for use with vacuum toilets. One embodiment of the system provides a two-stage flush that uses a transient tank in between the toilet bowl and the main aircraft waste tank, which reduces the noise level associated with the flush process because a lesser vacuum is demanded for the first stage of the flush. Embodiments of the system further capture grey water from a sink basin in a reservoir and use that water in the toilet flush process. There is further provided a lavatory odor removal system option that is activated during the second stage of the flush.

19 Claims, 8 Drawing Sheets

(51) Int. Cl.
  *E03D 5/00* (2006.01)
  *E03F 1/00* (2006.01)
  *E03D 9/05* (2006.01)

(56) References Cited

U.S. PATENT DOCUMENTS

| | | | | |
|---|---|---|---|---|
| 4,561,132 | A | * | 12/1985 | Lew et al. ............... 4/420 |
| 4,928,326 | A | * | 5/1990 | Olin et al. ............... 4/300 |
| 4,955,091 | A | | 9/1990 | Grills et al. |
| 5,035,011 | A | * | 7/1991 | Rozenblatt et al. ............ 4/665 |
| 5,133,853 | A | | 7/1992 | Mattsson et al. |
| 5,201,082 | A | | 4/1993 | Rockwell |
| 5,251,346 | A | | 10/1993 | Donati |
| 5,317,766 | A | | 6/1994 | McDonald et al. |
| 5,406,657 | A | | 4/1995 | Donati |
| 5,421,040 | A | | 6/1995 | Oldfelt |
| 5,813,047 | A | | 9/1998 | Teichroeb |
| 5,924,967 | A | | 7/1999 | Furlani et al. |
| 6,216,285 | B1 | | 4/2001 | Olin et al. |
| 6,226,807 | B1 | | 5/2001 | Rozenblatt et al. |
| 6,325,356 | B1 | | 12/2001 | Rozenblatt |
| 6,353,942 | B1 | | 3/2002 | Pondelick et al. |
| 6,536,054 | B2 | | 3/2003 | Anderson et al. |
| 6,536,055 | B2 | | 3/2003 | Pondelick et al. |
| 7,118,677 | B2 | | 10/2006 | Hoffjann et al. |
| 7,533,426 | B2 | | 5/2009 | Pondelick |
| 7,947,164 | B2 | | 5/2011 | Hoffjann et al. |
| 2001/0034902 | A1 | | 11/2001 | Tyler |
| 2006/0288472 | A1 | | 12/2006 | Pondelick |
| 2008/0185477 | A1 | * | 8/2008 | Seibt ............... B64D 11/02 244/118.5 |
| 2009/0043380 | A1 | | 2/2009 | Blaha et al. |
| 2009/0074518 | A1 | | 3/2009 | Mueller et al. |
| 2010/0251472 | A1 | | 10/2010 | Culwell |
| 2012/0051977 | A1 | | 3/2012 | Boodaghians et al. |
| 2013/0036539 | A1 | | 2/2013 | Zahir et al. |
| 2013/0146783 | A1 | | 6/2013 | Boodaghians et al. |
| 2013/0305444 | A1 | | 11/2013 | Boodaghians et al. |
| 2014/0020167 | A1 | | 1/2014 | Rieger et al. |
| 2014/0137319 | A1 | | 5/2014 | Beach et al. |
| 2016/0272320 | A1 | | 9/2016 | Beach et al. |

FOREIGN PATENT DOCUMENTS

| | | |
|---|---|---|
| DE | 102008018270 A1 | 10/2009 |
| EP | 0363012 A1 | 4/1990 |
| EP | 1698735 A1 | 9/2006 |
| EP | 2690015 A1 | 1/2014 |
| GB | 2248858 A | 4/1992 |
| JP | 2001049181 A | 2/2001 |
| JP | 2015522729 | 8/2015 |
| WO | 03004785 A1 | 1/2003 |
| WO | 2014081912 | 5/2004 |
| WO | 2013/172953 | 11/2013 |
| WO | 2014081912 A3 | 10/2014 |

OTHER PUBLICATIONS

Invitation to Pay Additional Search Fees and Partial Search Report dated Jun. 3, 2014 in Application No. PCT/US2013/071150.
Dual Flush Toilet Is a Sink and Greywater System in One http://inhabitat.com/dual-flush-toilet-is-a-sink-and-greywater-system-in-one/ three pages Mar. 10, 2013.
U.S. Appl. No. 61/714,912, filed Oct. 17, 2012.
PCT/US2013/071150, Search Report and Written Opinion dated Aug. 14, 2014, 19 pages.
International Patent Application No. PCT/US2013/071150, International Preliminary Report on Patentability dated Jun. 4, 2015.
U.S. Appl. No. 14/085,976, Office Action dated Mar. 3, 2015.
U.S. Appl. No. 14/085,976, "Final Office Action", Oct. 9, 2015, 10 pages.
CN2013800255343, "Office Action", Oct. 10, 2015, 20 pages.
International Patent Application No. PCT/US2013/031224, International Preliminary Report on Patentability dated Nov. 27, 2014.
U.S. Appl. No. 15/165,178, Non-final Office Action dated Oct. 18, 2016.
U.S. Appl. No. 15/165,178, Final Office Action dated Feb. 9, 2017.
U.S. Appl. No. 14/085,976, Office Action dated Jan. 15, 2016.
China Patent Application No. 201380025534.3, Office Action dated Jun. 29, 2016.

* cited by examiner

TWO-STAGE FLUSH AND GREY WATER FLUSH SYSTEMS AND DEVICES

CROSS REFERENCE TO RELATED APPLICATIONS

This application claims the benefit of U.S. Provisional Application Ser. No. 61/648,194, filed May 17, 2012, titled "Grey Water Flush System," the entire contents of which are hereby incorporated by reference.

FIELD OF THE INVENTION

Embodiments of the present invention generally relate to flushing systems for use with vacuum toilets. Certain embodiments find particular use on-board passenger transport vehicles as they seek to reduce noise levels by providing a flushing cycle that demands lesser vacuum levels for at least a portion of the flush cycle. Certain embodiments also help reduce aircraft weight and water by reusing grey water in the flush cycle.

BACKGROUND

Many types of passenger transport vehicles (such as aircraft, ships, buses, trains, and any other passenger transport vehicles) use vacuum toilets in order to flush septic waste, which is then delivered to a septic holding tank on board the vehicle. Such septic holding tanks are typically fluidly connected to the vacuum toilet system via a series of conduits, valves, and vacuum pumps in order to flush and route septic waste to the holding tanks. The vacuum created for the flushing action may either be via one or more vacuum pumps, or, in the case of an aircraft in flight, via a pressure differential. For example, aircrafts typically have a vacuum disposal system that applies a vacuum to pull waste media and flush water/spent water from toilets and/or sinks into an on-board waste water storage tank. The suction is generated either by the pressure differential between the pressurized cabin and the reduced pressure outside of an aircraft at high flight altitudes or by a vacuum generator at ground level or at low flight altitudes.

Although efficient, vacuum toilets create a loud noise level during the flush cycle, due to the amount of vacuum that needs to be applied in order to cause the septic waste to travel from the toilet basin to the holding tank. A loud flushing sound is created when the flush valve opens; the differential pressure is what forcefully draws the waste down the drain, and the pressure differential must be large enough to cause the waste to flow the entire distance from the toilet basin to the septic holding tank, which can be located quite far from the lavatory.

In addition to vacuum toilets, passenger lavatories also contain sinks for hand washing. For example, most commercial aircraft are equipped with galley and lavatory sinks. These sinks are typically intended for the disposal of fluid waste, soiled water from hand washing, and so forth. The spent water from sinks is referred to as "grey water," as opposed to "black water" which has a urine or fecal component. (In addition to hand-washing water overflow from the lavatory, grey water can also include water from galley sinks Fluids from the galley can contain items such as leftover portions of beverages and water from melting ice, or any other form of "used" or spent water that drains from the water system. Grey water can also drain from wash basins during hand washing, or any other instance in which water is soiled or loaded with waste, such as e.g., soaps, detergents, soils from hand washing, and so forth). These sinks are typically connected to small diameter drain lines (which can easily back up if clogged) and may either terminate at the aircraft drain mast for exhaustion to the atmosphere or may be delivered to a grey water holding tank. Although most large passenger transport vehicles are equipped with a grey water system for collecting, storing and ultimately disposing of grey water, providing a separate grey water holding tank is not always economical due to the additional weight that such systems add to the aircraft. (In the absence of special valves, such as those described by U.S. Pat. No. 7,533,426 titled "Grey Water Interface Valve Systems and Methods," health standard guidelines for airlines require that septic water ("black water") be vacuumed away separately from grey water because, if a back-up were to occur, sewage would be expelled from galley and lavatory sinks, as well as toilets, which could create a myriad of health problems.) Accordingly, the added expense of keeping grey and black water separate has generally been necessary.

The present inventors have sought to provide a way to re-use the grey water in connection with a toilet basin flush system. Although vacuum toilets use much less water than a typical gravity flow toilet, it is still desirable to find a way to re-use the spent/grey water rather than using fresh water for each flush cycle, due to cost and weight considerations of maintaining fresh water on-board. The present inventions have also sought to reduce the noise associated with vacuum flushing. They have further sought to provide new ways to vent plumbing conduits in order to help remove odors from the vacuum flushing system.

BRIEF SUMMARY

Embodiments of the invention described herein thus provide a grey water flush system for use with vacuum toilets. One embodiment of the system provides a two-stage flush that uses a transient tank in between the toilet bowl and the main aircraft waste tank, which reduces the noise level associated with the flush process because a lesser vacuum is demanded for the first stage of the flush. Embodiments of the system further capture grey water from a sink basin in a reservoir and use that water in a typical flush process or in the two-stage toilet flush process described. The two-stage flush and the use of grey water as flush water may be used on their own or in combination with one another. There is further provided a lavatory odor removal system option that is activated during the second stage of the flush.

DETAILED DESCRIPTION

Figure 1:
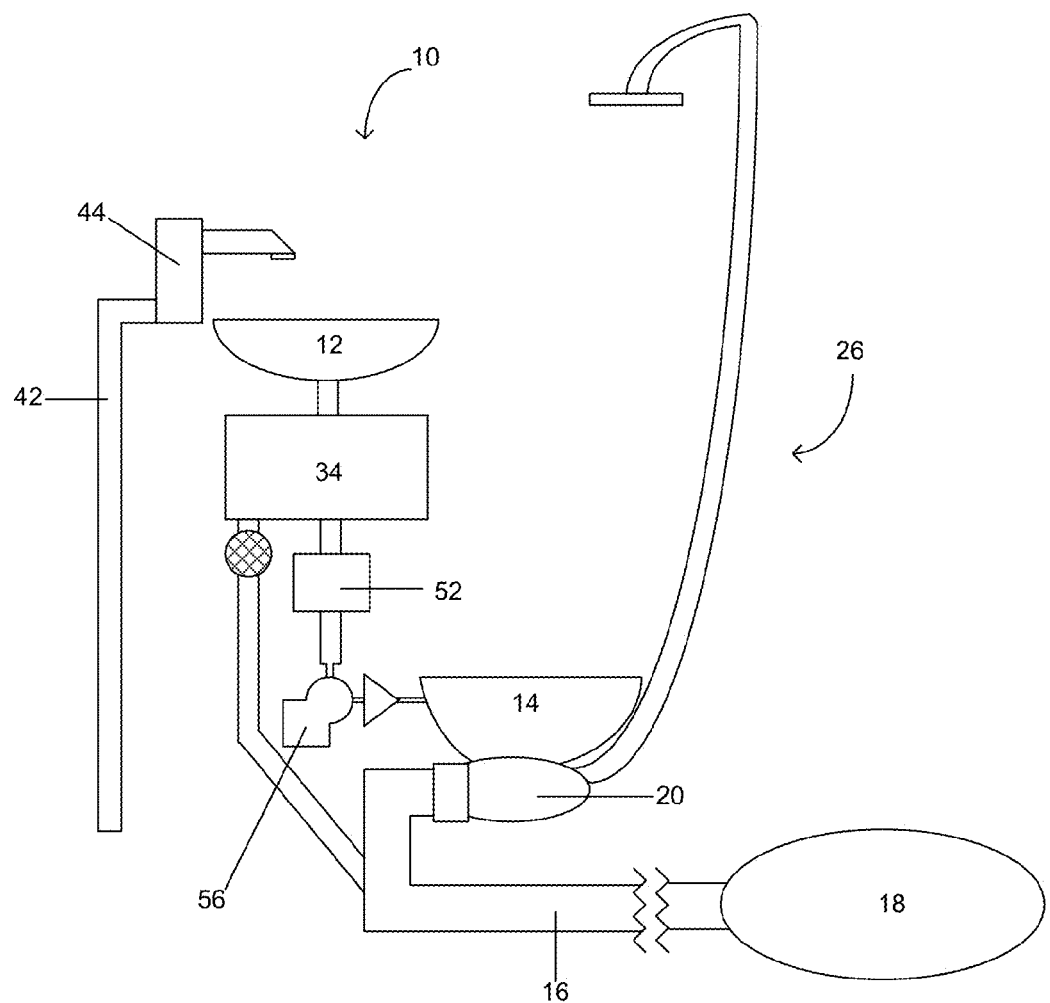
FIG. 1 shows a side schematic view of one embodiment of a grey water flush system.

Embodiments of the present invention provide a way to use grey water (e.g., spent water from a faucet or sink basin, typically in the lavatory) for flushing a vacuum-based toilet. Although the embodiments are described herein with respect to an aircraft vacuum toilet system, it should be understood that the features shown and described may be used in connection with any type of vacuum toilet system, such as those positioned on-board sea-going vessels, trains, buses, and even stationary buildings that use vacuum toilet systems. FIG. 1 illustrates a grey water flush system 10 is used in connection with a lavatory on-board a passenger transport vehicle. Typical lavatories have a wash basin 12 and a vacuum toilet bowl/basin 14. The toilet bowl 14 is generally connected to a main waste line 16 which leads to a waste storage/holding tank 18. As discussed above, during a typical flush cycle, waste from the toilet bowl 14 is suctioned through the main waste line 16 via a strong suction that causes the waste to travel from the bowl 14 to the holding tank 18 via a single application of vacuum.

Figure 2:
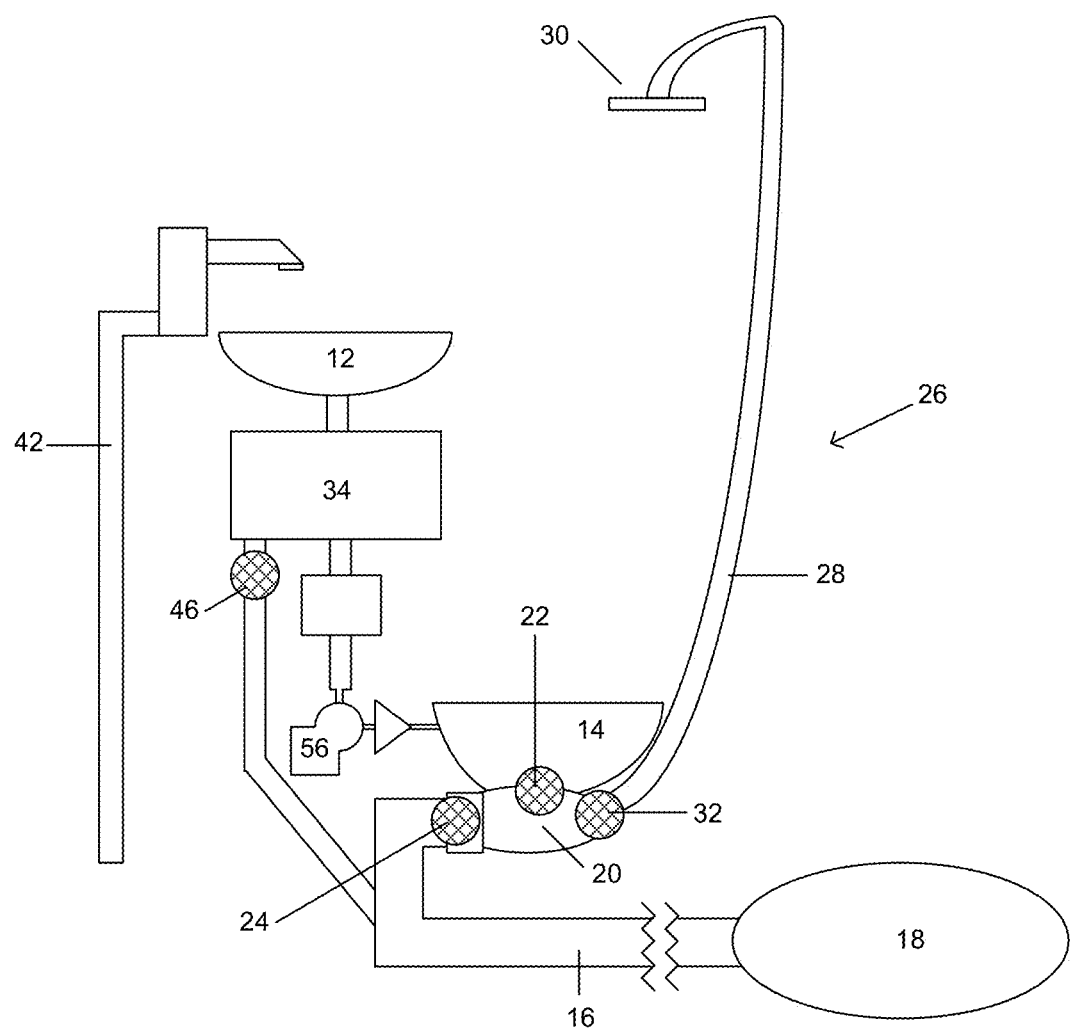
FIG. 2 shows a side schematic view of the grey water flush system of FIG. 1, further illustrating valves that function during the various flush stages.
Figure 7:
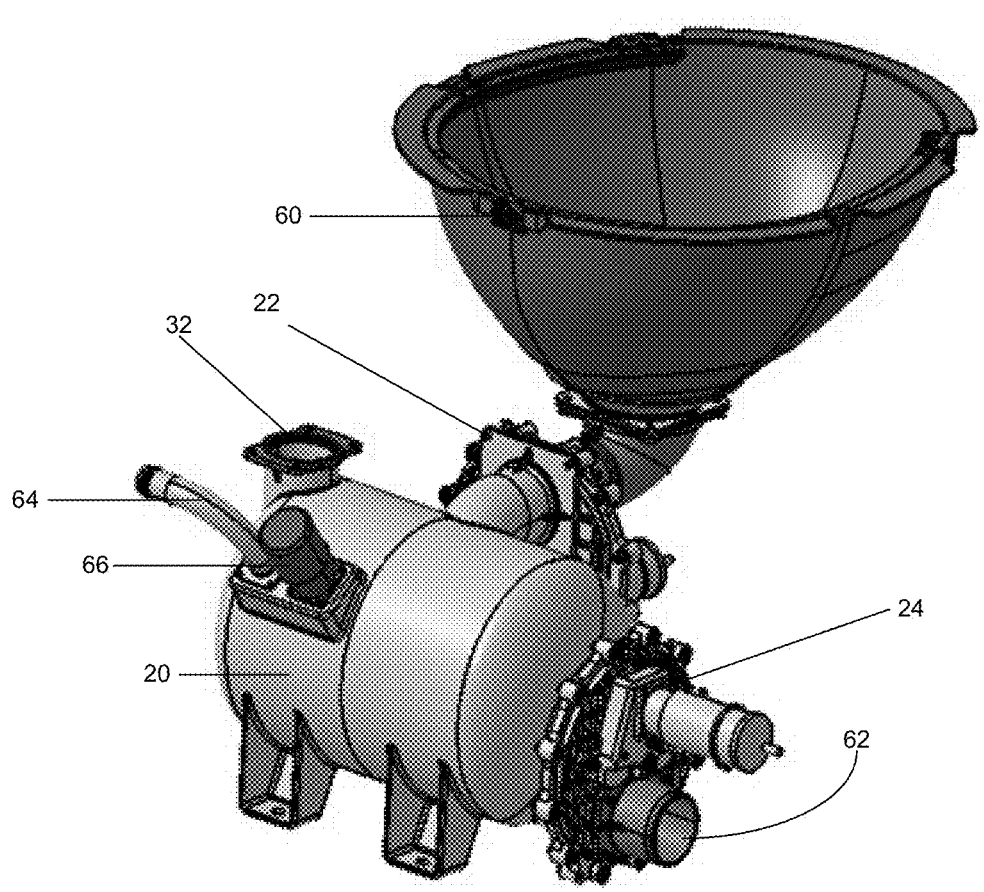
FIG. 7 shows a side perspective view of one embodiment of a toilet bowl and a transient tank for use in connection with a two-stage flush cycle.

The present system adds a two-stage flush. The two-stage flush is accomplished by providing a transient waste tank 20 plumbed in-line between the toilet bowl 14 and the main aircraft waste holding tank 18. In a specific embodiment, the transient tank 20 is attached to or otherwise connected close by the toilet bowl 14. As shown in FIG. 2, a first valve 22 is positioned between the vacuum toilet bowl 14 and the transient waste tank 20. When a flush sequence is triggered, waste in the bowl 14 is transferred from the bowl 14 to the transient tank 20 through valve 22. This is a relatively short distance, as compared to transferring the waste all the way to the main waste holding tank 18. The transient tank 20 is thus necessarily charged with only small amount of vacuum; just enough to pull the waste the short distance from the toilet bowl 14 to the transient tank 20. (One exemplary design showing a specific configuration between the bowl 14 and the tank is illustrated in FIG. 7.) This first stage of the two-stage flush process reduces the noise level associated with a full flushing cycle (from the vacuum toilet bowl 14 into the main waste holding tank 18) by demanding a lesser vacuum for the transfer of waste into the transient waste tank 20.

Once the waste has been transferred to the transient tank 20, the second stage of the flush can begin. This second stage is the stage in which the waste in the transient tank is moved to the main waste tank. In this stage, the valve 22 closes and one or more additional valves are allowed to open. In a specific embodiment, the second stage of two-stage flush has two features—one feature is a waste transfer step and a second feature is an odor removal step. It is expected that for optimal functioning, both of these features function simultaneously together, and the valves controlling each feature open at the same time. This provides sufficient air flow to help move the waste out of the transient tank 20 and through lines 16 to the main tank 18. However, it should be understood that these features and valves may function as two separate steps, such that one step (waste transfer) occurs followed by a separate step (odor removal). For the sake of convenience, the first feature of waste transfer step is described first.

During the waste removal step, the valve 22 closes and the valve 24 opens. Valve 24 is positioned between the transient waste tank 20 and the main waste tank 18. Valve 22 may be connected to a pump and/or an actuator that controls a motor with preprogrammed microprocessor logic, such that immediately or shortly after valve 22 closes, a second valve 24 opens. (As discussed, the odor removal valve 32 may also open at this same time, even though its steps are described separately.)

The second valve 24 is positioned between the transient waste tank 20 and the main waste line 16 (which leads to main waste tank 18). During this second stage of the two-stage flush, a moderate to large vacuum is applied to transfer the waste from transient waste tank 20 to the main aircraft waste tank 18. This split waste transfer operation is achieved by a multi-valve sequential system, and results in a quieter vacuum toilet. The closure of the first valve 22 during the vacuum step that transfers the waste a longer distance provides a sound buffer for the second stage of the flush.

Figure 8:
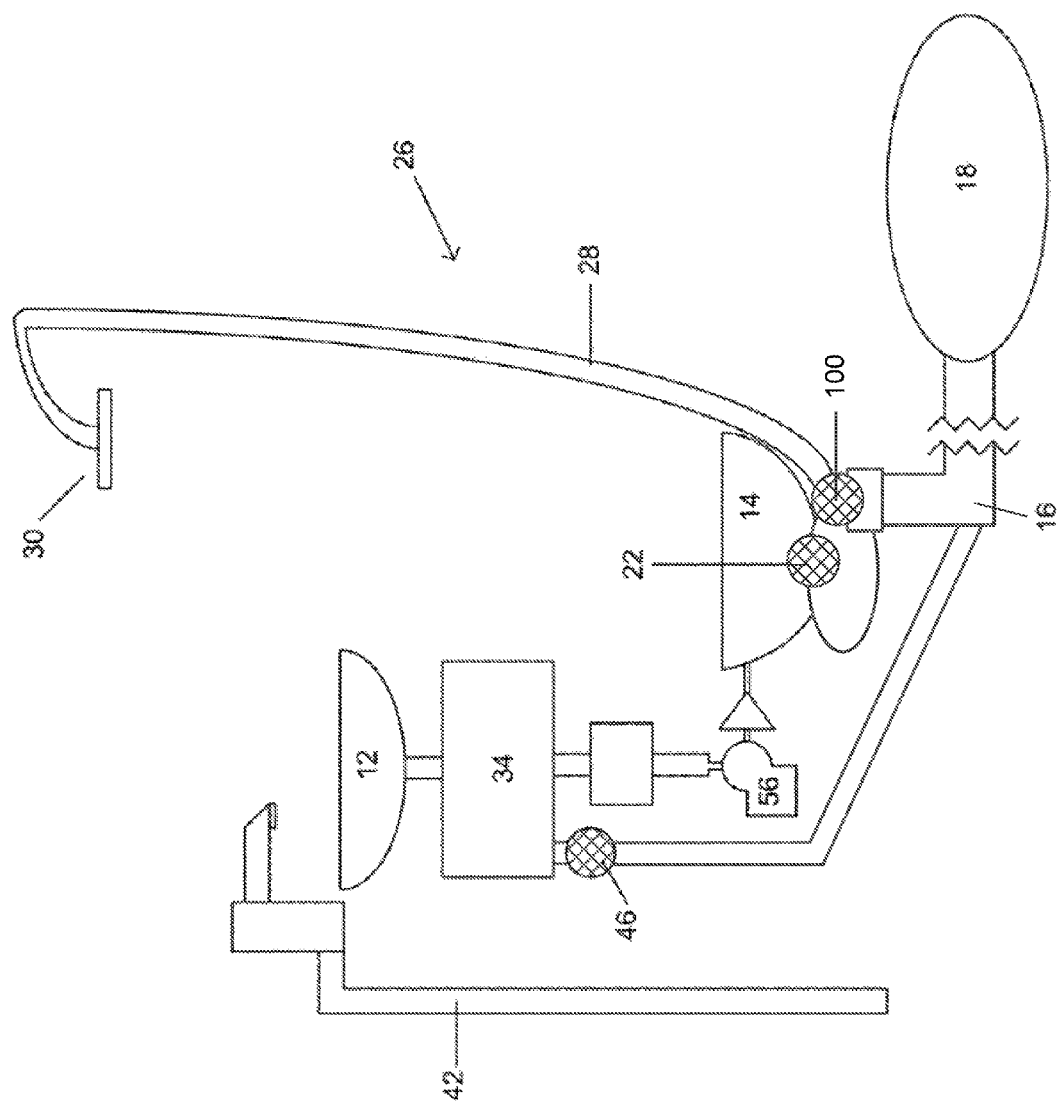
FIG. 8 shows an embodiment of a transient tank and odor line incorporating a multi-port valve that combines the function of the second stage flush with odor removal.

It is also envisaged that the two-stage flush mechanism may facilitate lavatory odor reduction and/or elimination of lavatory odor by providing an odor removal system 26. In this embodiment, the odor removal system comprises an odor removal line 28, an air muffler 30, and a valve 32 for odor removal. (Alternatively, valve 32 for odor removal may be provided as a multi-port valve 100 that combines the function of second stage flush valve 24 and odor removal valve 32, as discussed below. This is illustrated by FIG. 8.) If this odor removal feature is provided, the valve 32 is configured to open during the second stage of the flush. In a specific embodiment, both the second and third valves (24, 32) open simultaneously for the second stage. Odor is extracted through the odor removal line 28 via the air muffler 30. The air muffler vents air away from the lavatory. The muffler 30 may function to deliver air out of the lavatory and pull it into the odor removal line 28, which ultimately leads to the main waste lines 16. In the embodiment shown, the muffler 30/air odor removal line 28 pulls air from the lavatory through the muffler 30 and then into the transient tank 20, continuing onto the main waste line 16 and main waste tank 18 during the flush cycle. In an alternate embodiment (not shown), the muffler 30/air odor removal line 28 pulls air from the lavatory through the muffler 30 straight to the main waste line 16 (and continuing onto the main waste tank 18 during the flush cycle.)

Figure 3:
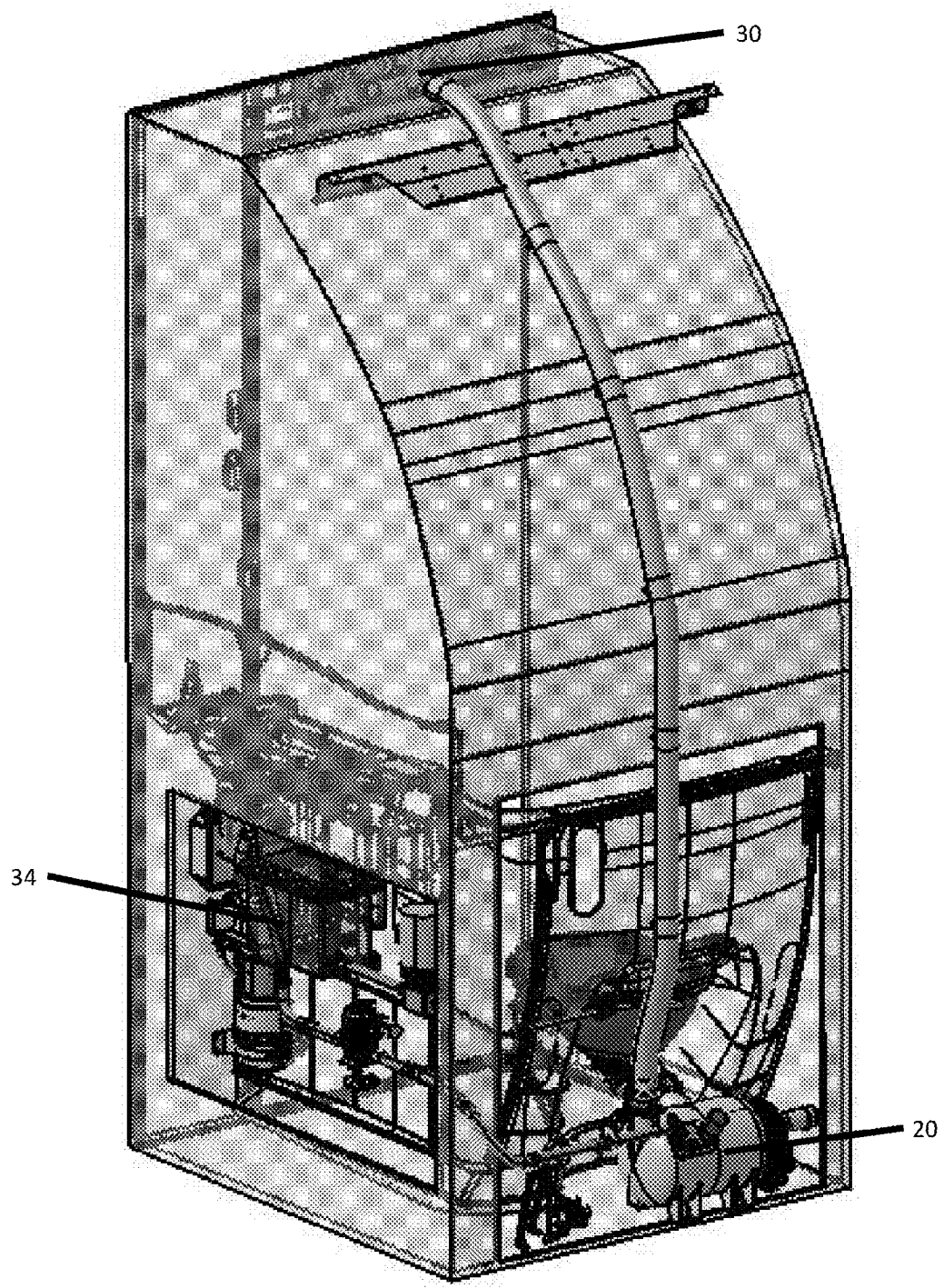
FIG. 3 shows a perspective view of an odor removal system that may be used in connection with the grey water flush system.

Without air muffler 30, the air would whistle through the lavatory, and the muffler helps silence the extraction of air through the odor removal system 26. A perspective view of this system is illustrated by FIG. 3.

It is important to note that although FIGS. 1 and 2 show the second valve 24 and the odor removal valve 32 as being two separate valves, it should be understood that they may be combined into a single multi-port valve 100, as illustrated by FIG. 8. (One example of a multi-port valve that may be useable in connection with this invention is shown and described in the co-pending and co-assigned application titled "Multi-Port Orbital Valve," U.S. Ser. No. 61/714,912, filed Oct. 17, 2012.) This valve allows the two valves to open and/or close at the same time or otherwise as desired.

Once the flush cycle has been completed, valve(s) 24 and/or 32 close, and the entire system is again under vacuum. The second stage of the flush restores vacuum to the transient tank 20 so that it is also ready for another flush.

Although this two-stage flush system may be used with fresh water or other water circulated on-board the aircraft, it is understood that the use of fresh water for toilet flushing purposes is wasteful if spent or grey water can be used. Accordingly, it is possible to provide a grey water reservoir 34 that can deliver flush water to the toilet bowl 13. As shown in FIG. 1, the grey water reservoir 34 is generally positioned between the wash basin 12 and the vacuum toilet bowl 14. Reservoir 34 is in fluid communication with the wash basin 12, such that spent water from hand washing is collected in the reservoir 34. This reservoir 34 may be any appropriate size, although in one embodiment, it is sized small enough to fit underneath the wash basin 12 without taking up a great deal of lavatory space. Accordingly, if excess water is collected in the reservoir 34 past its capacity without it being used for toilet flush water as described below, overflow provisions are provided. In a particular embodiment, reservoir 34 has approximately a one liter capacity, although smaller and larger options may be provided. The reservoir is shown in the figures as being a generally rectangular container, but it should be understood that any shape or configuration is possible and within the scope of this invention.

Figure 4:
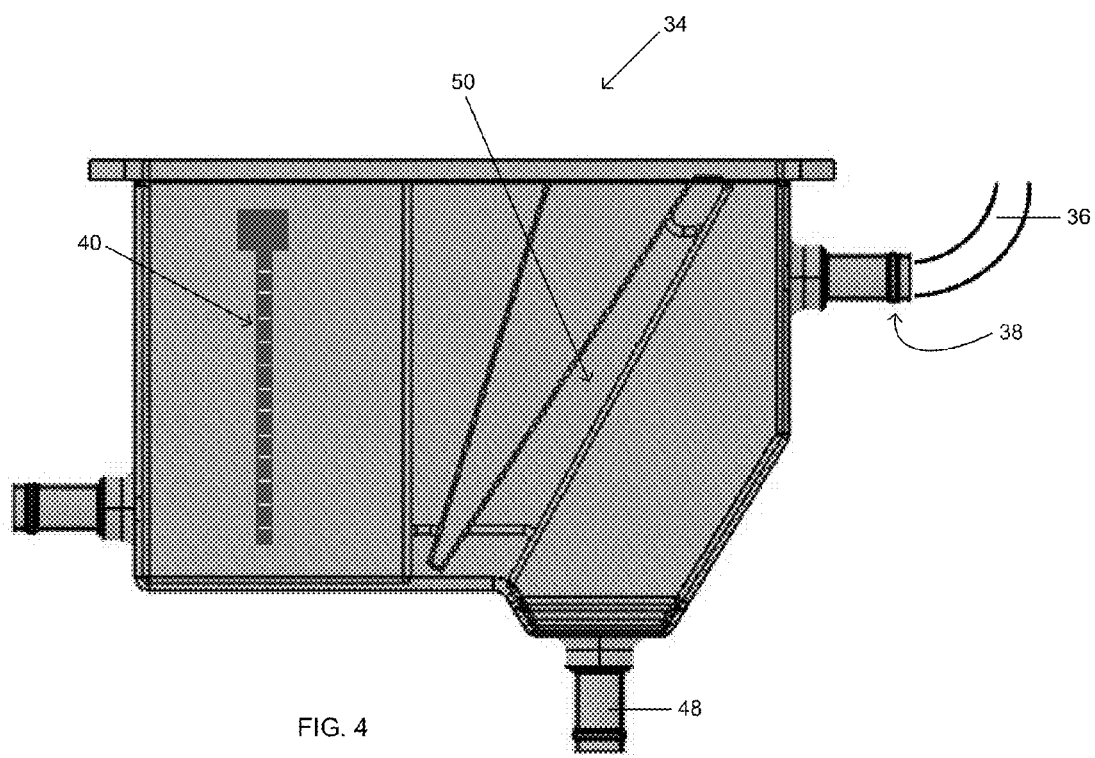
FIG. 4 shows a side cut away view of a grey water reservoir with an angled filter positioned therein.

The reservoir 34 is in fluid communication with the wash basin 12 via conduit 36. As shown in FIG. 4, conduit 36 may be secured to an inlet 38 of the reservoir 34. This allows spent water from the sink to be delivered to and captured in the reservoir 34. A water level sensor 40 is provided on or otherwise associated with the reservoir 34, which indicates the amount of water that the reservoir 34 currently holds. If the sensor 40 detects that the water level in the reservoir 34 is so low that it does not contain sufficient grey water to support the next flush cycle, then water may be delivered to the reservoir 34 via a connection to the aircraft main water tank and/or by opening and shutting the faucet. (Although these connections are not shown by the Figures, it is understood that an additional line from the potable water line 42 that delivers water to the faucet 44 may be routed to the reservoir 34.)

If the sensor 40 detects that the water level in the reservoir 34 is so high that it may backflow back into the wash basin 12, then an overflow system may be activated to prevent flooding. In one embodiment, overflow system includes a purge valve 46 (or pinch valve) that may be activated to deliver the excess grey water out of an outlet 48 in the reservoir to the main waste line 16. Typically, the water exiting through outlet 48 is unfiltered or untreated grey water. When the purge or pinch valve opens, the vacuum in the toilet system causes the excess water to rush out of the reservoir 34 into the main line 16 and/or main waste tank 18. (When the water sensor 40 senses that the water level is low, the pinch valve closes, causing water to accumulate in the reservoir 34 as desired.) In another embodiment, the overflow system may discharge excess grey water directly into the toilet or into the transient tank 20 on the next flush cycle.

The water sensor 40 may be a pressure-based sensor, a capacitance-based sensor, or any other appropriate sensor sufficient to detect the presence or absence of water in the reservoir 34. In one embodiment, it may be useful to use a sensor that has a probe that is not in direct contact with the water, as any debris in the water (such as detergents, particulates, or bacteria) can create false readings and be more difficult to maintain and/or clean.

If neither a high nor a low condition is sensed by the water level sensor 40, then normal operation of the grey water in the reservoir 34 for use as flush water may follow. In one embodiment, the system includes a spent (or grey) water treatment system. The spent water treatment system is generally provided to ensure that the water being held in reservoir 34 is not contaminated when it is used for flush water. (During the toilet flush, water particles can spray into the air. Although the flush water need not be potable, it is desirable that the flush water be free from particulates, pathogens, and other potential bacteria or contaminants. It is also desirable that the flush water be treated so that it does not damage the toilet components or cause discoloration of the toilet bowl 14.)

Figure 5:
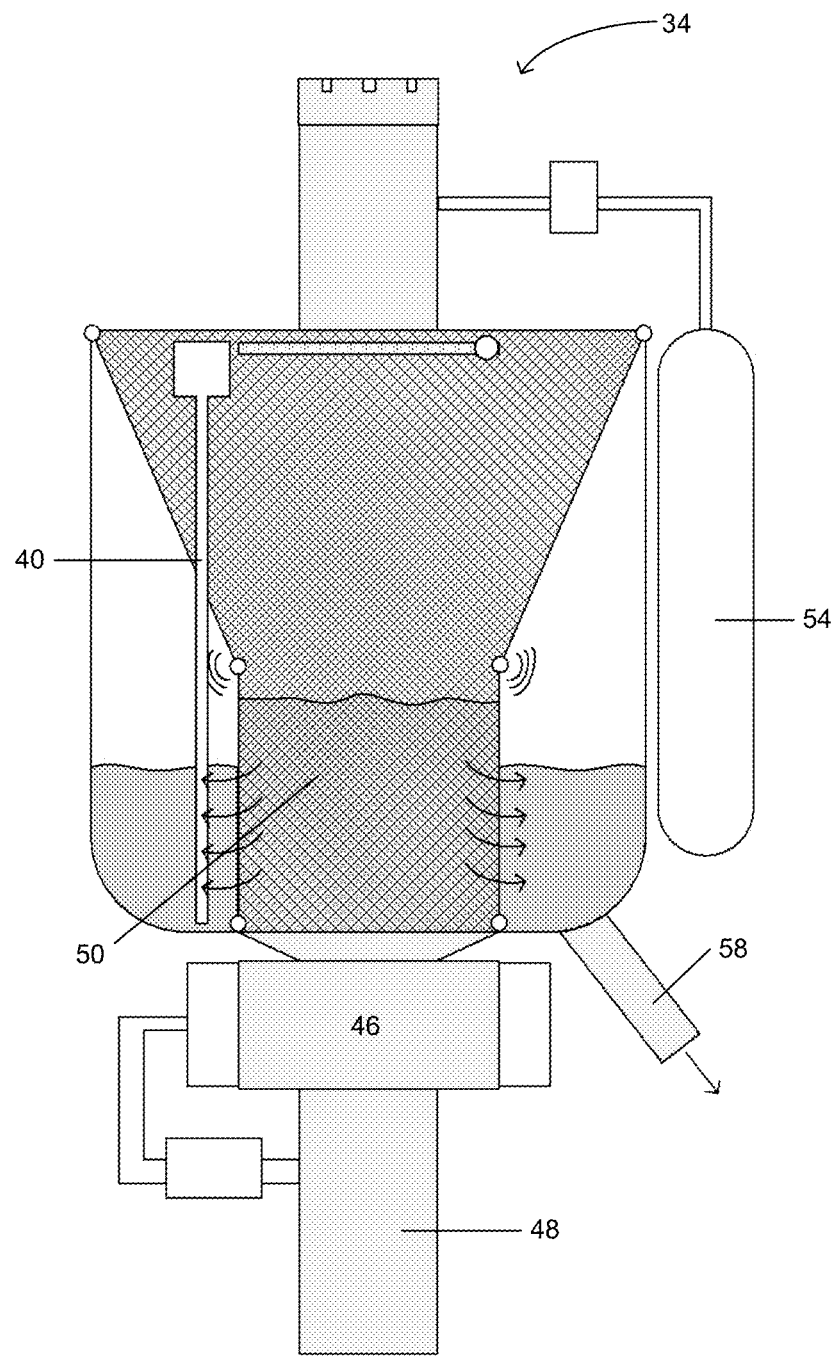
FIG. 5 shows a side cut away view of a grey water reservoir with a cylindrical filter positioned therein and having a chemical reservoir for treatment.
Figure 6:
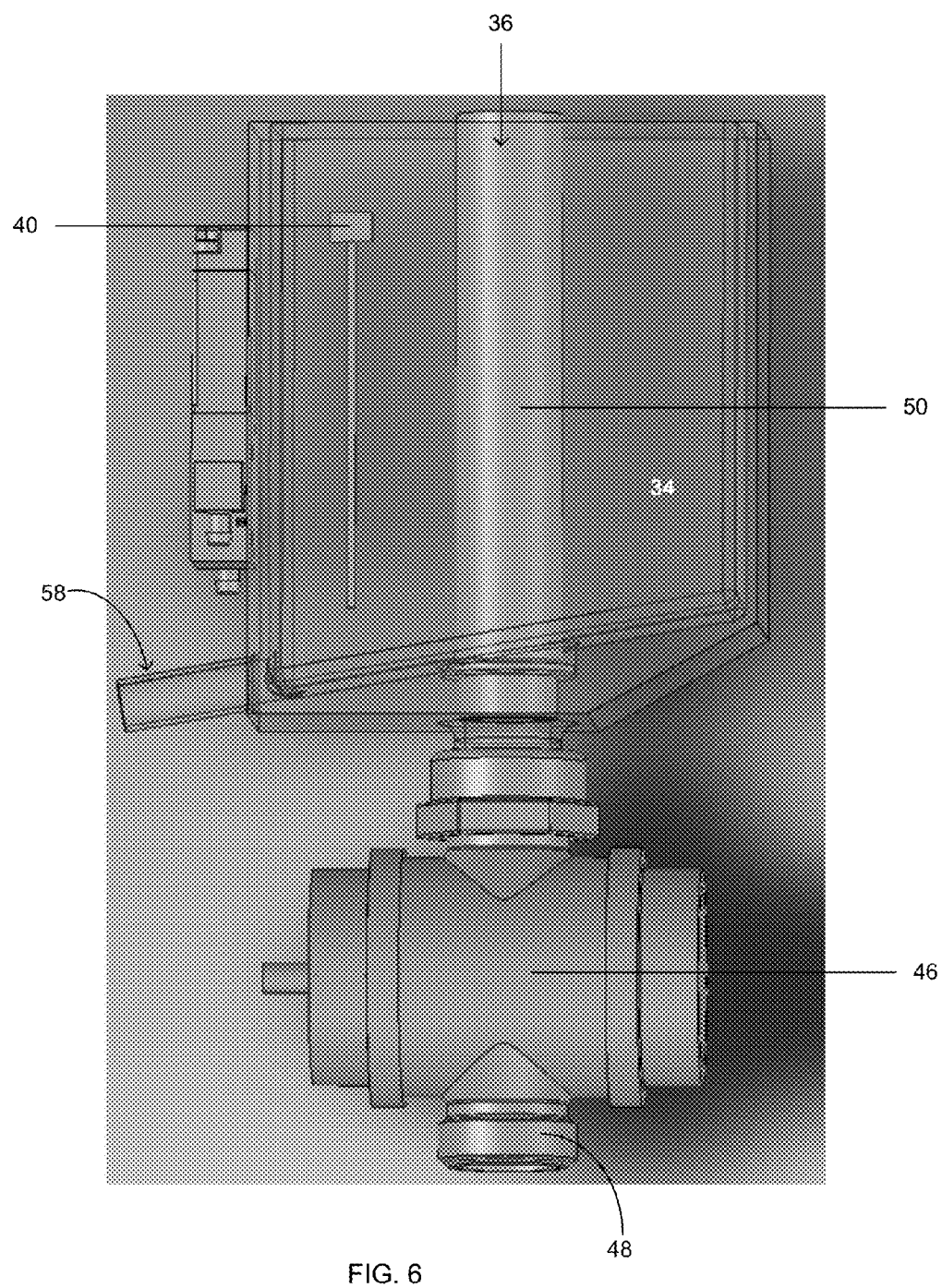
FIG. 6 shows an alternate embodiment of the reservoir of FIG. 5.

Accordingly, the spent water treatment system may include a filter 50 that removes small suspended materials, such as particulates in the water. Filter 50 may also have anti-microbial properties. The filter 50 may be positioned in the reservoir 34 in any appropriate manner. FIG. 4 shows a replaceable filter that is angled in the reservoir. FIGS. 5 and 6 show a cylindrical filter, which may be a cylindrical replaceable filter cartridge. This first filter step is intended to remove particulates (and possibly some pathogens) from the grey water, and any appropriate filter designed for such purpose is possible for use.

Additionally and/or alternatively, an ultraviolet (UV) light treatment step may be conducted, for eradication of microbiological contamination. This UV treatment may occur inside the reservoir, although it may also occur as a separate treatment in chamber 52, as shown in FIGS. 1 and 2, as the water is being delivered to the toilet bowl 14. As shown, UV chamber may be connected in-line with the reservoir 34. Non-limiting examples of various types of UV treatment that may be used for this treatment are described in co-pending and co-assigned applications titled "Inline UV LED Water Disinfection and Heating," U.S. Ser. No. 13/707,808, filed Dec. 7, 2012, as well as co-pending and co-assigned applications titled "Systems and Methods for Disinfecting Water," filed Aug. 31, 2010 and published as U.S. 2012/0051977.

Additionally and/or alternatively, a chemical treatment may be conducted on the grey water prior to its use as flush water. In one embodiment, a chemical reservoir 54 is provided as shown in FIG. 5, which can deliver appropriate and/or periodic chemical treatment or disinfectants to the grey water contained in the reservoir 34. Once the grey water has been sufficiently treated in order to meet required or desired regulations, it is ready for delivery to the toilet bowl 14 as flush water for use when a flush sequence is triggered. (It is possible that the some or all of the water treatment does not occur until the water is need for a flush sequence and is caused to be routed through a filter 50 and/or a UV chamber 52 and/or receives a chemical treatment 54 as it leaves reservoir 34.)

When a flush sequence is activated, a pump 56 may be activated to pull water through an outlet 58 in the reservoir 34, and to deliver the water to the toilet bowl 14 for a flush sequence. As an initial matter, the valves of the multi-valve flush system are all closed and the system is under vacuum pressure. As shown in FIG. 7, the toilet bowl has a rinse inlet 60, to which the cleaned grey water is delivered. The flush sequence then follows the two-stage flush sequence described above. Specifically, the first valve 22 between the toilet bowl 14 and the transient waste tank 20 opens and functions to deliver the waste to transient tank 20 during the first stage of the flush. Other valve(s) remain closed during the first stage. During the second stage of the flush, the first flush valve 22 closes, which prevents any transfer of vacuum to the toilet bowl 14. The second valve 24 (typically opened simultaneously or nearly simultaneously with the odor removal valve 32) is then opened and functions to deliver the waste through tank outlet 62 to the waste holding tank 18. The odor removal valve 32 also causes air to be pulled into the odor removal line 28.

The time between the first and second stage is generally very short and can be anywhere from a few milliseconds, to a few seconds, but should generally be shorter than a few minutes. The primary intent is that the first valve 22 is not opened at the same time that the valve(s) located further downstream are open. FIG. 7 also shows an embodiment of the system that has a connection/conduit 64 on the transient tank 20 which is fluidly connected to outlet 58 on reservoir 34 for draining grey water from the reservoir 34 into the transient tank 20. FIG. 7 also illustrates an optional vacuum gauge 66 that can be used to monitor the vacuum level in the tank 20 and aid in controlling the flush cycle.

Changes and modifications, additions and deletions may be made to the structures and methods recited above and shown in the drawings without departing from the scope or spirit of the invention and the following claims.

What is claimed is:

1. A two-stage flush system for use in connection with a vacuum toilet, wherein the vacuum toilet is configured to be installed in a lavatory and plumbed in-line with a main waste line that leads to a main waste holding tank under vacuum, comprising:
   (a) a vacuum toilet bowl,
   (b) a transient waste tank below the vacuum toilet bowl plumbed in-line between the vacuum toilet bowl and the main waste holding tank,
   (c) an odor removal line;
   (d) a first valve positioned between the vacuum toilet bowl and the transient waste tank, wherein the transient waste tank is under an initial vacuum pressure prior to a flush, and wherein a first stage flush sequence opens the first valve to transfer waste from the vacuum toilet bowl to the transient waste tank;
   (e) a second valve positioned between the transient waste tank and the main waste line, and
   (f) a third valve positioned between the transient tank and the odor removal line, wherein once the first stage flush sequence is complete and the first valve is closed, a second stage flush sequence simultaneously opens the second valve and the third valve, wherein opening of the second valve allows vacuum to transfer waste from the transient waste tank to the main waste holding tank, wherein opening of the third valve pulls air out of the lavatory, into the odor removal line, and into the transient tank, wherein the air follows the transfer of waste to the main waste holding tank through the second valve,
   wherein time between the first stage flush sequence and the second stage flush sequence is a few milliseconds to a few seconds.

2. The two-stage flush system of claim 1, wherein the second valve comprises a multi-port valve, wherein one port of the multi-port valve leads to the main waste line and a second port of the multi-port valve comprises the third valve that leads to the odor removal line.

3. The two-stage flush system of claim 1, further comprising a water basin, with a grey water reservoir in fluid communication with the water basin.

4. The two-stage flush system of claim 3, wherein grey water from the water basin is collected in the grey water reservoir and delivered to the vacuum toilet when a flush sequence is triggered.

5. The two-stage flush system of claim 3, wherein grey water collected from the basin is treated prior to being delivered to the vacuum toilet.

6. The two-stage flush system of claim 5, wherein the grey water is treated via filtration, ultraviolet light, chemical treatment, or any combination thereof.

7. The two-stage flush system of claim 1, wherein when the first valve is opened to transfer waste from the toilet bowl to the transient tank, the second valve remains closed.

8. The two-stage flush system of claim 7, wherein after transfer of the waste from the toilet bowl to the transient tank, the first valve closes, and the second valve opens to transfer the waste from the transient tank to the main waste holding tank.

9. The two-stage flush system of claim 7, wherein the third valve comprises an odor removal valve, wherein after transfer of the waste from the toilet bowl to the transient tank, (a) the first valve closes, (b) the second valve opens to transfer the waste from the transient tank to the main waste holding tank, and (c) simultaneous with the opening of the second valve, the odor removal valve opens to pull air through the odor removal line and into the main waste line.

10. A grey water flush system for use in connection with an aircraft lavatory having a vacuum toilet, wherein the vacuum toilet is configured to be plumbed in-line with a main waste line that leads to a main waste holding tank under vacuum, comprising:
    (a) a water basin for hand-washing;
    (b) a grey water reservoir in fluid communication with the water basin in order to collect spent grey water;
    (c) a vacuum toilet bowl,
    (d) a transient waste tank plumbed in-line between the vacuum toilet bowl and the main waste holding tank, wherein the transient waste tank is charged with an initial vacuum;
    (e) an odor removal line;
    (f) a first valve positioned between the vacuum toilet bowl and the transient waste tank, wherein a first stage flush sequence opens the first valve to transfer waste from the vacuum toilet bowl to the transient waste tank;
    (g) a second valve positioned between the transient waste tank and the main waste line, and
    (h) a third valve positioned between the transient tank and the odor removal line, wherein once the first stage flush sequence is complete and the first valve is closed, a second stage flush sequence simultaneously opens the second valve and the third valve, wherein opening of the second valve allows vacuum to transfer waste from the transient waste tank to the main waste holding tank, wherein opening of the third valve pulls air out of the lavatory, into the odor removal line, and into the transient tank, wherein the air follows the transfer of waste to the main waste holding tank through the second valve.

11. The grey water flush system of claim 10, wherein the grey water reservoir comprises a water sensor to detect a level of grey water in the reservoir.

12. The grey water flush system of claim 10, wherein the grey water reservoir is configured to accept water if level of grey water in the reservoir is insufficient for a flush cycle and to purge water if the level of grey water in the reservoir is in danger of overflowing.

13. The grey water flush system of claim 10, wherein the second valve comprises a multi-port valve, wherein one port of the multi-port valve leads to the main waste line and a second port of the multi-port valve comprises the third valve that leads to the odor removal line.

14. The two-stage flush system of claim 1, wherein the first stage flush uses less vacuum than the second stage flush.

15. The two-stage flush system of claim 1, further comprising a conduit pipe positioned between the vacuum toilet bowl and the transient waste tank.

16. The two-stage flush system of claim 1, wherein the second valve and the third valve are combined into a single multi-port orbital valve.

17. The two-stage flush system of claim 1, further comprising and air muffler at a lavatory-end of the odor removal line.

18. The grey water flush system of claim 10, wherein the second valve and the third valve are combined into a single multi-port orbital valve.

19. The grey water flush system of claim 10, further comprising and air muffler at a lavatory-end of the odor removal line.

* * * * *